(12) United States Patent
Okazaki et al.

(10) Patent No.: US 7,148,939 B2
(45) Date of Patent: Dec. 12, 2006

(54) LIQUID CRYSTAL DEVICE AND ELECTRONIC EQUIPMENT

(75) Inventors: Tsuyoshi Okazaki, Suwa (JP); Kinya Ozawa, Suwa (JP); Tsuyoshi Maeda, Yamanashi-ken (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 10/790,220

(22) Filed: Mar. 2, 2004

(65) Prior Publication Data

US 2004/0196417 A1 Oct. 7, 2004

(30) Foreign Application Priority Data

Apr. 1, 2003 (JP) ............................. 2003-098281

(51) Int. Cl.
*G02F 1/1333* (2006.01)

(52) U.S. Cl. ..................... 349/111; 349/130; 349/129

(58) Field of Classification Search ................ 349/111, 349/117, 114
See application file for complete search history.

(56) References Cited

U.S. PATENT DOCUMENTS

| | | | |
|---|---|---|---|
| 5,666,179 A | 9/1997 | Koma | |
| 5,786,876 A | 7/1998 | Ota et al. | |
| 6,040,886 A * | 3/2000 | Ota et al. | 349/141 |
| 6,426,786 B1 * | 7/2002 | Lu et al. | 349/125 |
| 6,540,361 B1 * | 4/2003 | Hayashi | 353/31 |
| 6,654,090 B1 * | 11/2003 | Kim et al. | 349/129 |
| 6,657,689 B1 * | 12/2003 | Baek | 349/114 |
| 6,917,404 B1 | 7/2005 | Baek | |
| 2002/0041351 A1 | 4/2002 | Baek | |

FOREIGN PATENT DOCUMENTS

| | | |
|---|---|---|
| JP | 04-285917 A | 10/1992 |
| JP | 06-301036 A | 10/1994 |
| JP | A 6-301036 | 10/1994 |
| JP | 07-159807 A | 6/1995 |
| JP | 07-234414 A | 9/1995 |
| JP | 10-186366 A | 7/1998 |
| JP | 2000-81641 A | 3/2000 |
| JP | 2000-267122 A | 9/2000 |
| JP | 2001-51231 A | 2/2001 |
| JP | 2002-075104 A | 3/2001 |
| JP | 2001-343653 A | 12/2001 |
| JP | 2002-148624 A | 5/2002 |
| KR | 10-0360355 | 1/1996 |
| KR | 10-0188124 | 12/1997 |
| KR | 2001-0007154 | 1/2001 |
| KR | 2001-0102804 | 11/2001 |

* cited by examiner

*Primary Examiner*—Andrew Schechter
*Assistant Examiner*—Richard Kim
(74) *Attorney, Agent, or Firm*—Oliff & Berridge, PLC

(57) ABSTRACT

To achieve clear image display without providing a feeling of roughness by fixing the position where disclination is generated in a liquid crystal device of a homeotropic alignment type, a conductive light shielding film provided on the side of an opposed substrate as a common electrode to drive a liquid crystal layer by pixel electrodes of an array substrate and the light shielding film of the opposed substrate.

11 Claims, 8 Drawing Sheets

F I G. 5
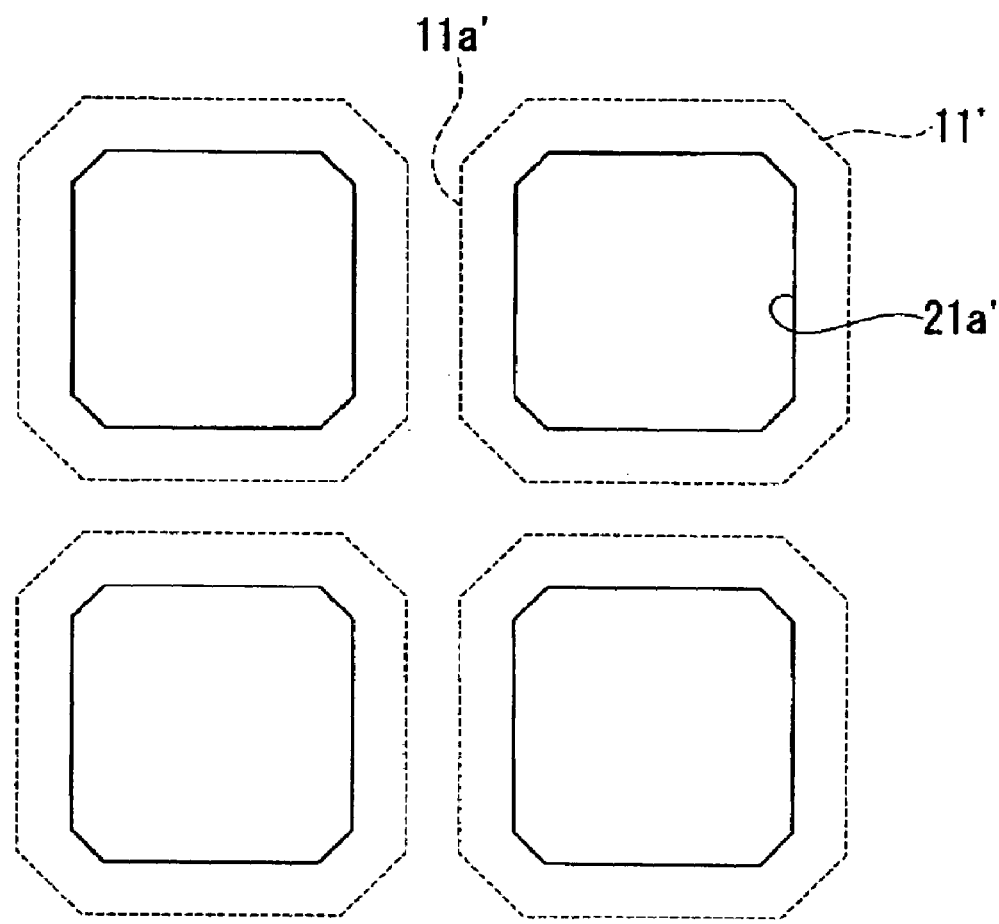

FIG. 7
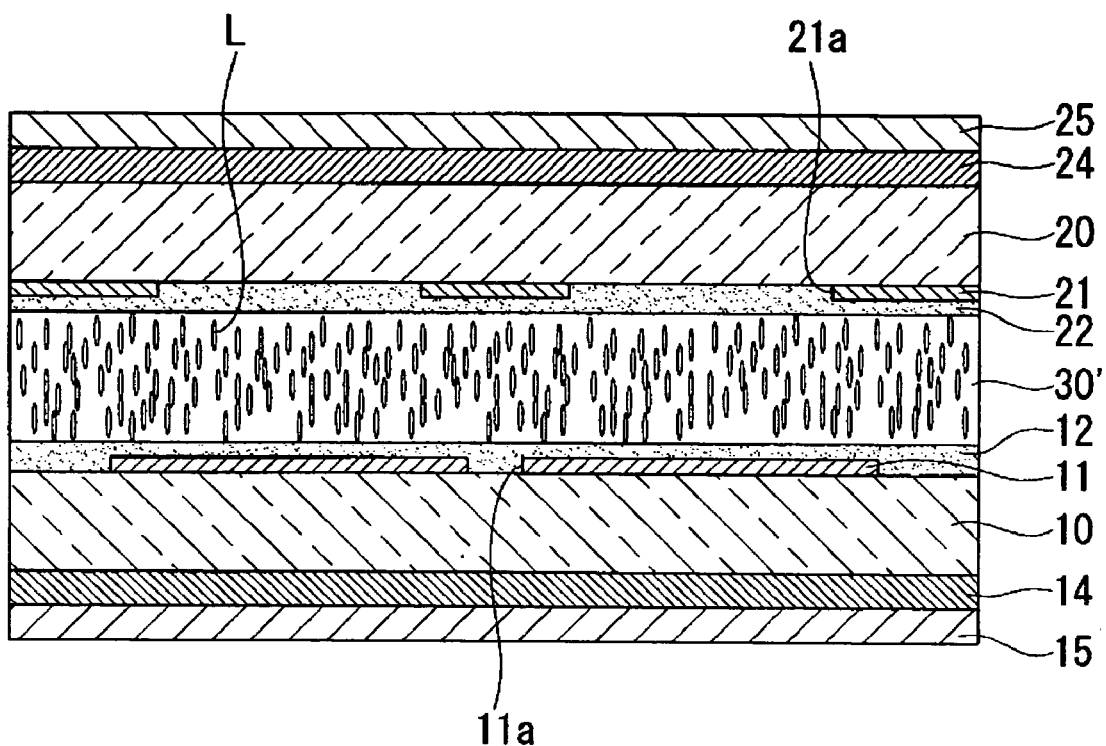
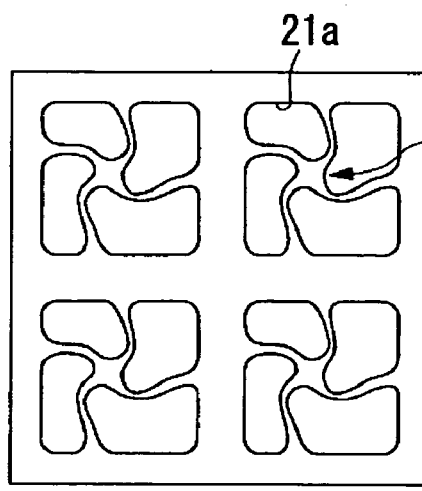
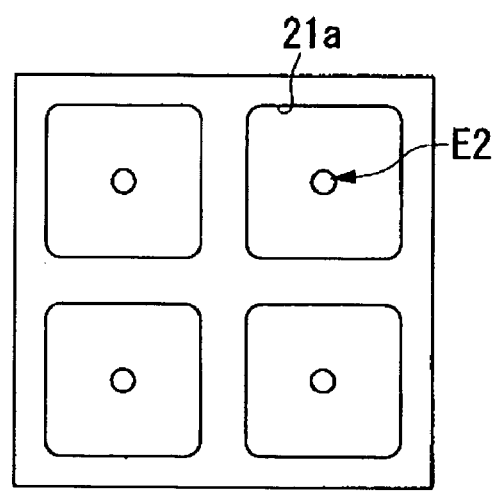
FIG. 8A         FIG. 8B

LIQUID CRYSTAL DEVICE AND ELECTRONIC EQUIPMENT

BACKGROUND OF THE INVENTION

1. Field of Invention

The present invention relates to a liquid crystal device and electronic equipment provided with the same and specifically, to an alignment control technology for a fine homeotropic alignment liquid crystal device suitable for being used in a light bulb in a projector, in a display unit of a mobile phone or a PDA, and so on.

2. Description of Related Art

A display of high-contrast and wide angle of visibility is required in the field of liquid crystal devices. A homeotropic alignment mode is presently being studied to realize such a display. A liquid crystal device of a homeotropic alignment type has a structure in which liquid crystal having negative dielectric anisotropy is enclosed between a pair of opposed substrates. One of these substrates is configured, for example, as an array substrate having a plurality of pixel electrodes arranged in a matrix manner and a TFT for switching each pixel electrode individually. A homeotropic alignment film is formed on the substrate surface.

The other substrate opposed thereto is formed on the entire surface of the substrate with a common electrode formed of a transparent conductive film, such as an ITO, and a homeotropic alignment film is formed thereon. In such a liquid crystal device, in order to reduce or prevent malfunction of the TFT due to a light beam from a light source coming from the side of the opposed substrate, or in order to reduce or prevent color blur between the adjacent dots in case of color display, a light shielding film is provided on the side of the opposed substrate. In particular, when using the liquid crystal device as a light bulb for a projector, the light shielding film as such is inevitable. The light shielding film is formed in a lattice-shape corresponding to the non-pixel areas and is disposed between the substrate body and the common electrode.

In such a liquid crystal device of a homeotropic alignment type, liquid crystal molecules are standing substantially perpendicular to the plane of the substrate due to the existence of the homeotropic alignment film in the initial state of alignment (the state of alignment when no voltage is applied), and this state is used as a black display. Therefore, display of higher black levels and higher contrast ratio than those in the TN type will be realized.

However, the liquid crystal device of a homeotropic alignment type is originally weak in alignment restraining force, and hence is liable to exhibit an unstable domain structure because the liquid crystal molecules are brought into various states of alignment when a voltage is applied thereto. Therefore, there is a case where an area in which the liquid crystal molecules are not fell down (disclination) is generated at a boundary between the adjacent domains, and the disclination area becomes unstable due to slight disarrangement of alignment on the substrate or variations in voltage application. Although it is not a serious problem as long as the disclination area is always generated at the same position, a feeling of roughness is generated on image display if the disclination area moves all over the panel.

In order to prevent deterioration of the image quality, for example, in Japanese Unexamined Patent Application Publication No. 6-301036, a structure in which openings are provided on a transparent common electrode at the positions opposing the centers of the pixel electrodes is proposed. In this structure, the liquid crystal molecules positioned in the area of the openings are hardly affected by an electric field generated between the pixel electrodes and the common electrode by application of a voltage. Thus, the liquid crystal molecules in the area of the openings are maintained in the initial state of homeotropic alignment. Therefore, the orientation of alignment of the liquid crystal molecules has a regularity with which they are aligned toward the center of the pixel. Hence unregulated occurrence of disclination is reduced or prevented, whereby clear image display without roughness is achieved.

SUMMARY OF THE INVENTION

However, in the structure described above, a new process of patterning of the common electrode is required for the opposed substrate in addition to a pattern forming process for the light shielding film and a common electrode forming process, which results in the cost increase.

In view of such problems described above, the present invention provides a liquid crystal device in which image display without roughness may be obtained with a simplified structure and electronic equipment provided therewith.

In order to achieve the aforementioned, a liquid crystal device according to an aspect of the present invention includes an array substrate on which a plurality of pixel electrodes are formed and arranged in a matrix manner, an opposed substrate on which a conductive light shielding film having openings at the positions opposing the pixel electrodes, and a liquid crystal layer interposed between the aforementioned both substrates. The aforementioned liquid crystal layer is formed of liquid crystal having negative dielectric anisotropy exhibiting homeotropic alignment in the initial alignment state, and is controlled in alignment by an electric field between the pixel electrodes and the aforementioned light shielding film.

In this structure, the light shielding film is used as a common electrode, and a transparent common electrode in the related art is omitted. Therefore, in the process of manufacturing the opposed substrate in the related art, a patterning process for the common electrode is no longer necessary, and hence productivity is increased, which is advantageous in terms of the cost.

In this structure, it is necessary to provide the light shielding film, which corresponds to the common electrode, in the vicinity of pixels in order to obtain a satisfactory numerical aperture. However, when a driving voltage is too low, only the liquid crystal molecules located in the narrow area in the vicinity of the light shielding film can be aligned. Therefore, the present inventors have studied the relation between the pixel pitch and the driving voltage, and verified that when the pixel pitch is set to 20 μm or below, the liquid crystal molecules located at the centers of the pixels can be aligned by applying a voltage, which is a voltage employed as a driving voltage for a light bulb in a projector or a monitor for mobile equipment. Therefore, it is desirable to set the pixel pitch to 20 μm or below when the present liquid crystal device is applied to electronic equipment which requires such low-voltage driving.

In the structure described above, a projection or an opening may be formed on the pixel electrode. Accordingly, the position of occurrence of disclination may be restrained within the area of the opening of the aforementioned pixel electrode, and hence image display with less roughness is achieved.

Chiral material may be added to the liquid crystal layer. In the structure in which the light shielding film, which corresponds to the common electrode, is arranged so as to surround the pixel electrodes, the liquid crystal molecules are twisted and fell down in predetermined directions when a voltage is applied. However, the tilting direction is not constant, and is unstable. The twisting direction of the liquid crystal molecules in one pixel is the same, but among pixels, the twisting direction is random and hence disclination occurs among pixels in which the twisting directions of the liquid crystal molecules are different. Therefore, a bright display is achieved by adding chiral material to the liquid crystal layer and making the twisting direction identical for every pixel.

The shape of the pixel electrode is preferably a polygonal shape having no acute-angled portion. Alternatively, it may be formed in a shape including a linear portion having no acute-angled portion (including bent portion) and a curved portion. Such a shape without an acute-angled portion resists generation of disclination and hence display of high-speed, wide angle of visibility, and high contrast is achieved. In particular, when a regular polygon or a circle shape is employed, the liquid crystal molecules are evenly aligned and divided in the respective directions in one pixel. Consequently, the contrast is enhanced, and the angle of visibility may be isotropically widened.

In the structure described above, a circular polarization injecting device to inject circular polarization onto the array substrate and the opposed substrate may be provided. In this structure, lowering of luminance caused by misalignment of the angle between the transmission axis of polarizer and a director of the liquid crystal molecules does not occur and hence bright display is achieved.

Electronic equipment of an aspect of the present invention is characterized in that the aforementioned liquid crystal device is provided. In this arrangement, electronic equipment which can provide high-quality display with less feeling of roughness may be provided at a low cost.

BRIEF DESCRIPTION OF THE DRAWINGS

FIG. 5 is a schematic showing the structure of a principal portion of the liquid crystal device according to a second exemplary embodiment of the present invention;

FIG. 7 is a cross-sectional schematic of the liquid crystal device according to a third exemplary embodiment of the present invention;

FIG. 8 is a schematic showing the state of alignment of the same liquid crystal device when a voltage is applied.

DETAILED DESCRIPTION OF EXEMPLARY EMBODIMENTS

First Exemplary Embodiment

Figure 1:
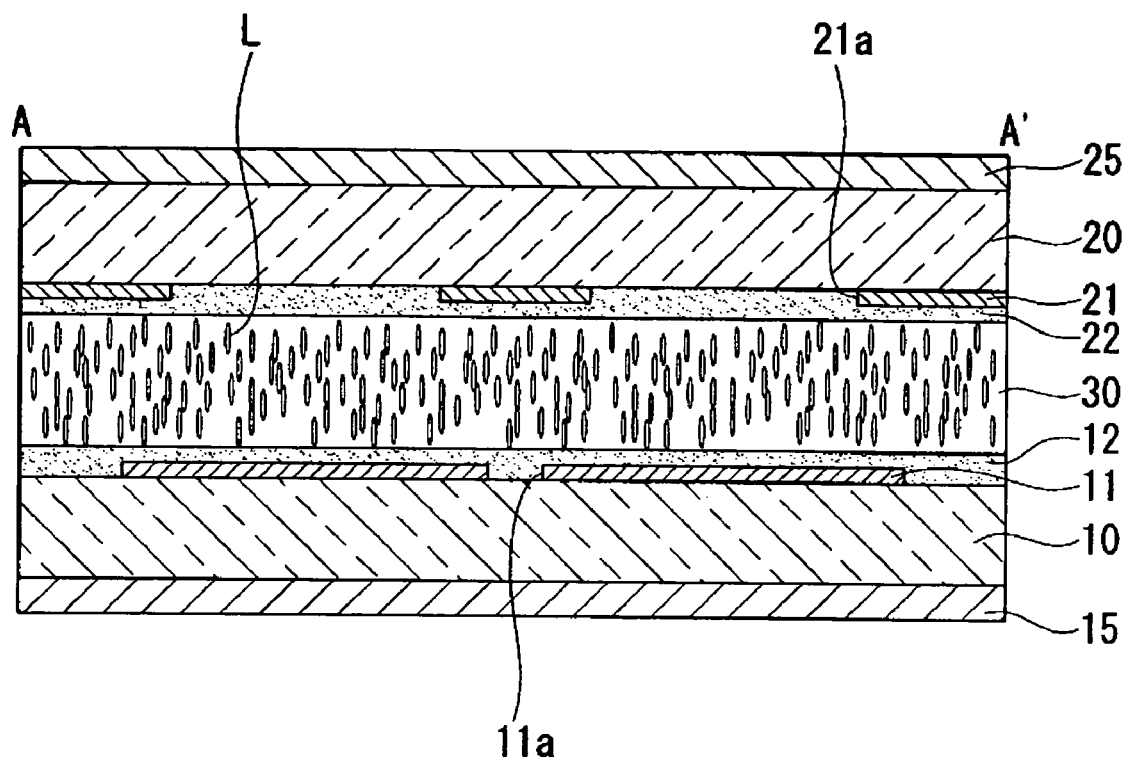
FIG. 1 is a cross sectional schematic of a liquid crystal device according to a first exemplary embodiment of the present invention.
Figure 2:
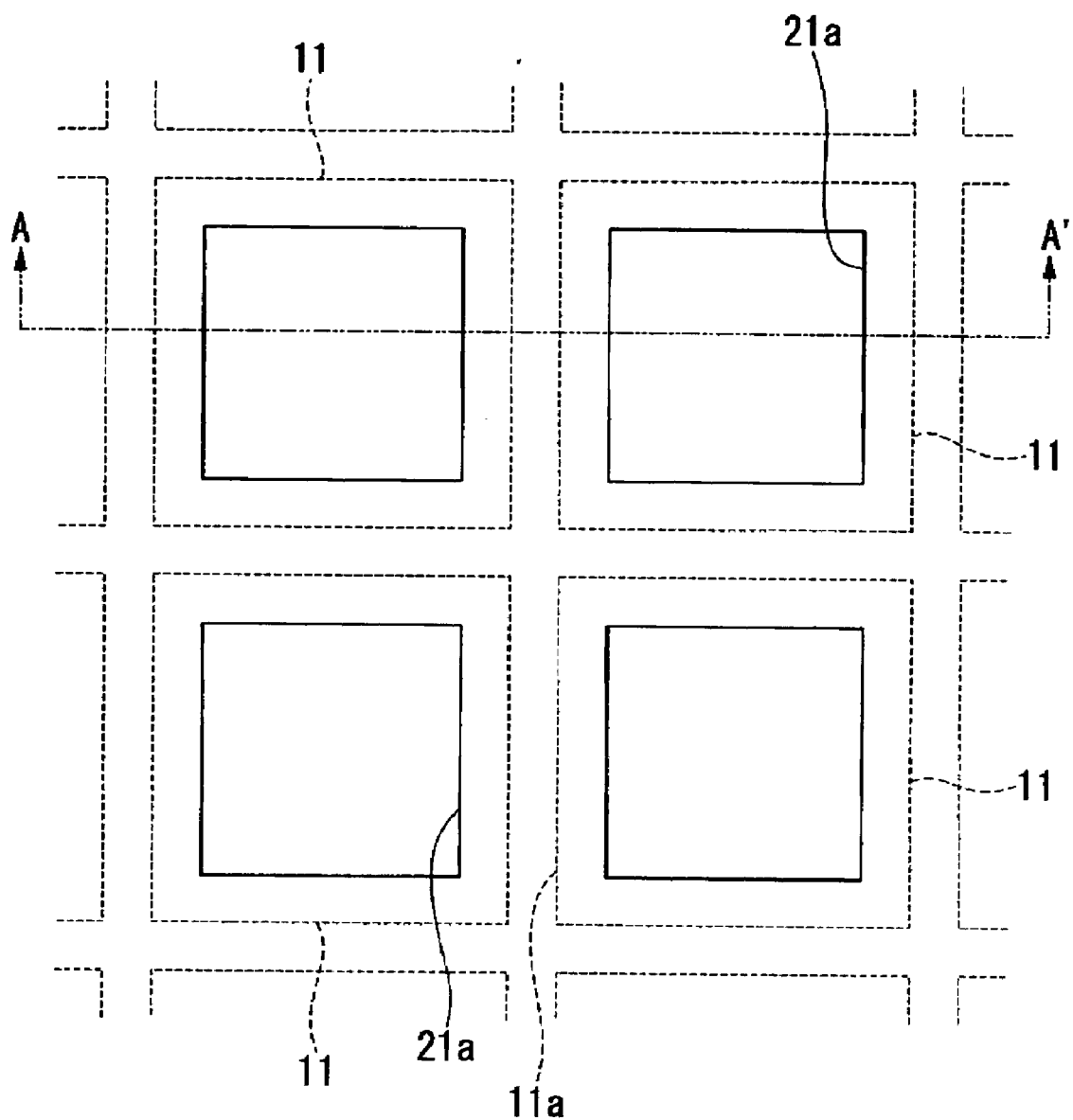
FIG. 2 is a schematic showing the structure of a principal portion of the same liquid crystal device.
Figure 3:
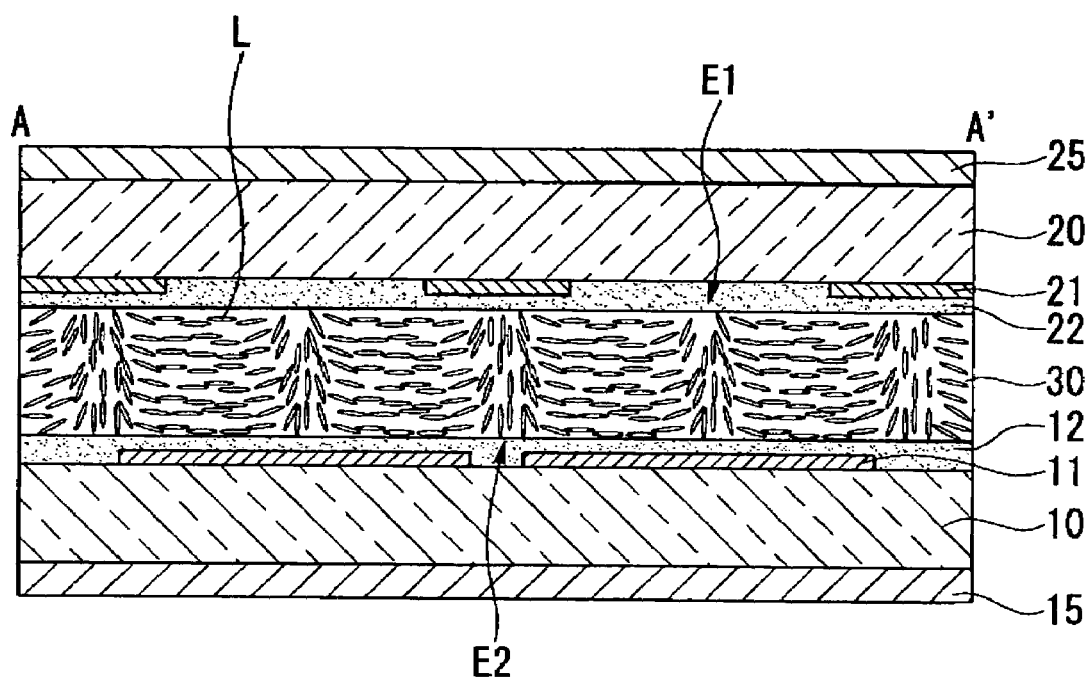
FIG. 3 is a cross sectional schematic showing the state of alignment of the same liquid crystal device when a voltage is applied.
Figure 4:
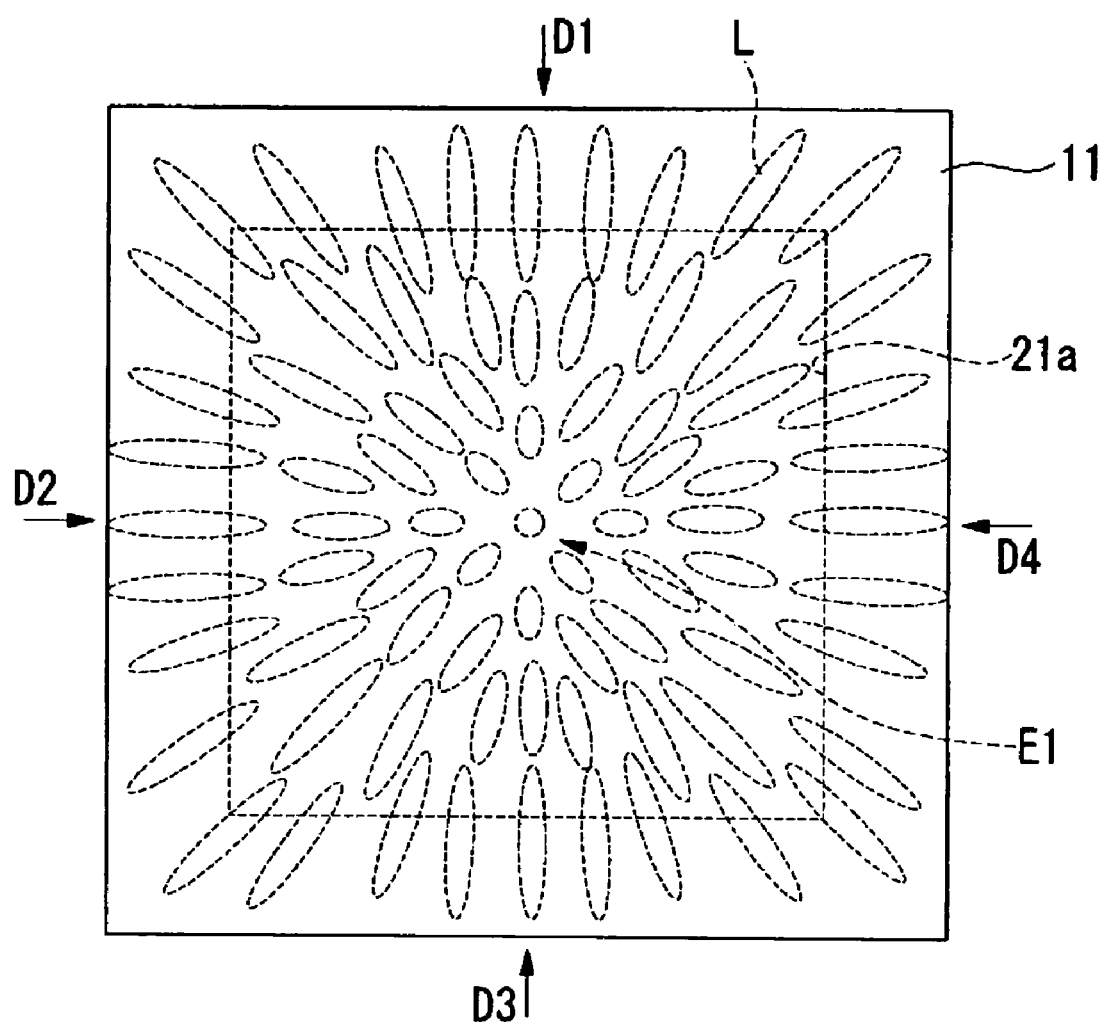
FIG. 4 is a schematic showing the state of alignment of the same liquid crystal device when a voltage is applied.

Referring now to FIG. 1 to FIG. 4, a liquid crystal device according to a first exemplary embodiment of the present invention will be described. FIG. 1 is a cross-sectional schematic showing a structure of the liquid crystal device according to the present exemplary embodiment. FIG. 2 is a schematic of a principal structure thereof when viewed from the side of the opposed substrate, FIG. 3 is a schematic showing a state of alignment of the liquid crystal when a voltage is applied. FIG. 4 is a schematic showing a state of alignment of the liquid crystal in one pixel. In these drawings, contraction scales of the layers or members are different from each other in order to make these layers or members recognizable in the drawings. In this specification, in each member constituting the liquid crystal device, the surface disposed on the side of the liquid crystal layer is referred to as "inner surface" and the opposite surface therefrom is referred to as "outer surface".

The liquid crystal device according to the present exemplary embodiment is a transmissive liquid crystal panel of high level of fineness having a pixel pitch in the order of 20 µm. As shown in FIG. 1, a liquid crystal having negative dielectric anisotropy is enclosed between a pair of opposed substrates 10, 20, and a liquid crystal layer 30 as a light modulating layer is made up of the aforementioned enclosed liquid crystal.

On the inner side of a lower substrate 10, formed of translucent material such as quartz, glass, or plastic, a plurality of substantially rectangular pixel electrodes 11, formed of a transparent conductive film, such as an ITO are arranged and formed in a matrix manner. A homeotropic alignment film 12 is formed so as to cover the pixel electrodes 11. In this exemplary embodiment, although a lower substrate 10 is configured as a TFT array substrate on which a switching element, such as a TFT, and various wirings, such as a data line or a scanning line are formed thereon, these elements and wiring are not shown in FIG. 1.

On the inner side of the upper substrate 20, formed of a translucent material such as quartz, glass, or plastic, a light shielding film 21, formed of a light shielding conductive film such as Al or Cr, is formed. A homeotropic alignment film 22 is formed so as to cover the light shielding film 21. The light shielding film 21 is formed of openings 21a at the positions opposing the pixel electrodes 11, and illuminating light enters into the liquid crystal layer 30 from the side of the substrate 20 via the openings 21a.

In order to enhance the translucency, the light shielding film 21 is disposed so as to partly overlap the pixel electrodes 11 two-dimensionally, as shown in FIG. 2. The light shielding film 21 is set to a common potential (for example, a ground potential), and constitutes a voltage applying device to apply driving voltage to the liquid crystal layer 30 together with the pixel electrodes 11. In other words, in the liquid crystal device of an aspect of the present invention, the light shielding film 21 is used as the common electrode in the related art, and accordingly, the common electrode or the opening forming process required in the structure of Japanese Unexamined Patent Application Publication No. 6-301036 described above is not necessary.

Polarizers 15, 25 are disposed on the outer surfaces of the lower substrate 10 and the upper substrate 20.

In this structure, when a voltage is applied between the pixel electrodes 11 and the light shielding film 21, liquid crystal molecules L located in the two-dimensionally overlapped area between the light shielding film 21 and the pixel electrodes 11 and in the area in the vicinity of the light shielding film 21 are aligned by the action of an electric field generated therebetween, as shown in FIG. 3. In this case, since the light shielding film 21, which corresponds to the common electrode, is disposed so as to surround the outer peripheries 11a of the pixel electrodes 11, as shown in FIG. 4, the liquid crystal molecules L radially fall down toward the centers of the pixels from the peripheries 11a of the pixels, and hence nucleus of disclination is stably formed at a center E1 of each pixel.

Since the center E1 of the pixel is less affected by the aforementioned electric field and, in addition, the tilting directions of the liquid crystal molecules therearound are concentrated to the area E1, the liquid crystal molecules L located in the area E1 cannot fall down. Hence they can be maintained in the initial state of homeotropic alignment stably. In this exemplary embodiment, since the pixel pitch is as small as the order of 20 μm, even when it is driven at a low voltage in the order of 5V, the effect of the aforementioned electric field stretches to the center E1 of the pixel. Thus, alignment of the liquid crystal molecules is controlled in substantially all the area in the pixel.

Since the aforementioned action of the electric field hardly occurs in an area E2 between the pixel electrodes 11, the liquid crystal molecules L existing in this area is maintained in the initial state of homeotropic alignment. However, illuminating light injected into the area E2 does not contribute to display because it is blocked by the light shielding film 21.

Therefore, according to the liquid crystal device of the present exemplary embodiment, the common electrode provided on the side of the opposed substrate in the related art is omitted. Instead, the conductive light shielding film 21 is used as the common electrode. Therefore, the structure of the device is simplified in comparison with those in the related art, and hence manufacture is facilitated. In addition, in this structure, since the light shielding film 21, which corresponds to the common electrode, is disposed so as to surround the peripheries 11a of the pixel electrodes 11 in plan view, the direction of alignment of the liquid crystal molecules L is restrained in four directions D1–D4 perpendicular to each side of the rectangular pixel electrode 11, and an area having four different directions of alignment is formed in the pixel. Consequently, the division of alignment is realized, and hence satisfactory characteristic in angle of visibility may be achieved.

In the present exemplary embodiment, since the pixel pitch is in the order of 20 μm, and low voltage driving is employed, the action of the electric field generated here may be stretched to the center E1 of the pixel. Therefore, the position of generation of disclination is reliably fixed to the narrow area at the center of the pixel. Hence bright image display without sense of roughness may be realized. In addition, in the present structure in which the light shielding film 21 is disposed so as to surround the peripheries 11a of the pixel electrodes 11 in plan view, the liquid crystal molecules L are hardly affected by the lateral electric field of the adjacent pixel electrode 11. Hence there is an advantage in that the tilting directions of the liquid crystal molecules L when a voltage is applied are stabilized.

Second Exemplary Embodiment

Figure 6:
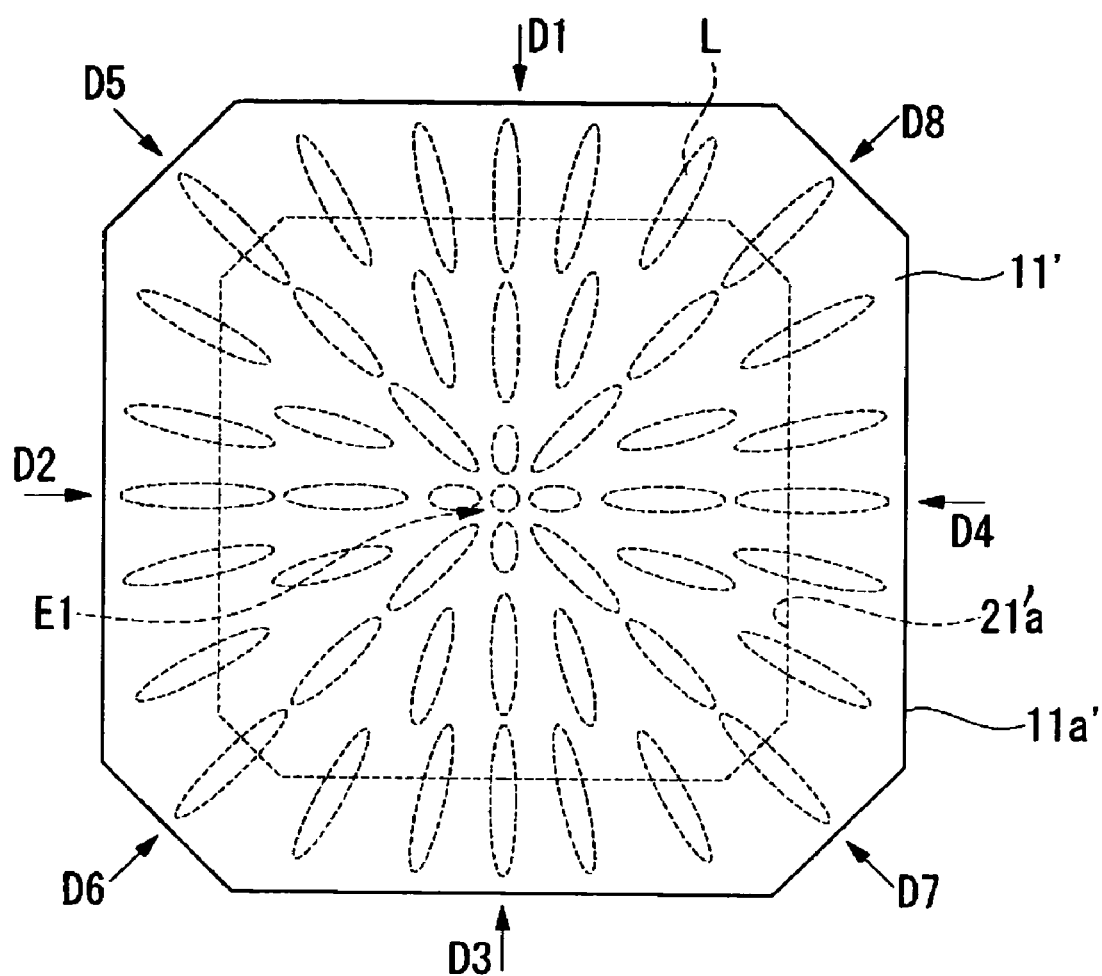
FIG. 6 is a schematic showing the state of alignment of the same liquid crystal device when a voltage is applied.
Figure 9:
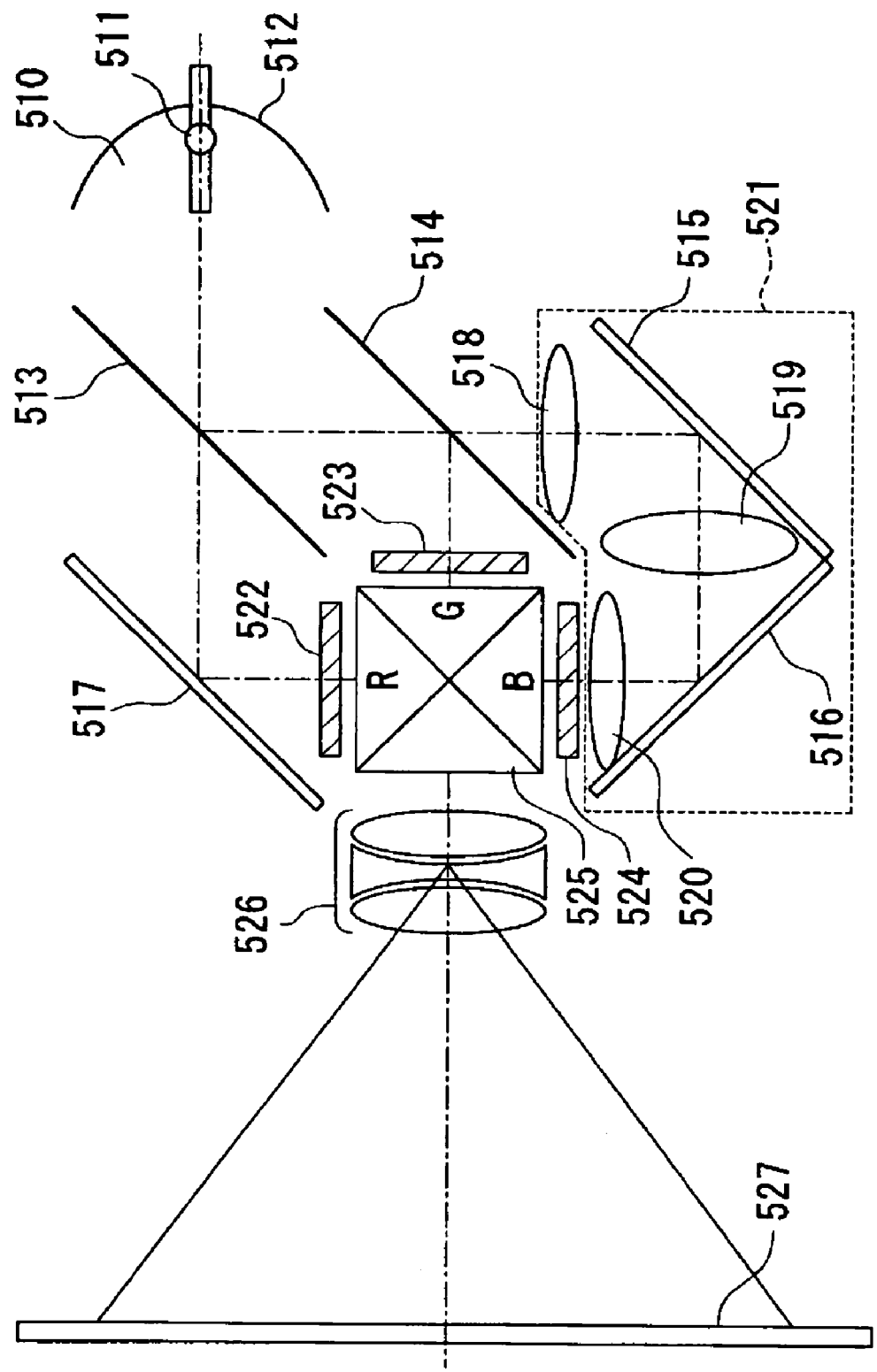
FIG. 9 is a schematic showing a projection type display device as an example of electronic equipment of an aspect of the present invention.

Referring now to FIG. 5 and FIG. 6, the liquid crystal device according to a second exemplary embodiment of the present invention will be described. In the present embodiment, the same parts as in the aforementioned first exemplary embodiment are represented by the same reference numerals, and will not be described here.

The present exemplary embodiment is a modification in structure of the aforementioned first exemplary embodiment, in which the shape of the pixel electrode and the shape of the opening of the light shielding film are modified. In other words, as shown in FIG. 5, a pixel electrode 11' in the present exemplary embodiment has an octagonal shape with the corners of the pixel electrode 11 in the aforementioned first exemplary embodiment cut off, and the light shielding film is formed with octagonal openings 21a' correspondingly. The shape of the pixel electrode 11' and the shape of the openings of the light shielding film may be a polygon having no acute-angled portion, such as a pentagon, hexagon, heptagon, or enneagon, in addition to the aforementioned octagon, and a shape having a curve, such as a circle or an oval, may also be applicable. In addition, it may be a shape formed of a linear portion (including a bent portion) and a curved portion. In addition, in this structure, since the light shielding film 21, which corresponds to the common electrode, is disposed so as to surround the peripheries 11'a of the pixel electrodes 11' in plan view. Other configurations are the same as in the first exemplary embodiment above.

Therefore, in the present exemplary embodiment, a bright display without a feeling of roughness is achieved in the simple structure and, in addition, generation of disclination itself can be reduced or prevented by forming a polygonal shape having no acute-angled portion for the pixels and the openings on the light shielding film. When employing a polygonal shape for the pixel electrode and the opening of the light shielding film, the direction of alignment of the liquid crystal molecules is restrained in a direction perpendicular to the respective sides of the polygon, and a plurality of domains being different in the tilting direction of the liquid crystal molecules (in the present exemplary embodiment, eight domains having the directions of alignment D1–D8 perpendicular to the eight sides of the pixel electrode 11') are formed in one pixel. In this case, if the shape of the pixel has an acute-angled portion, in two adjacent domains at this acute-angled portion, the liquid crystal molecules L are liable to fall down in the substantially opposite direction from each other. Thus the possibility of generation of disclination increases at the boundary. However, since no acute-angled portion exists in the shape of the pixel according to the present structure, the directions of alignment of the liquid crystal molecules of the adjacent domains are almost parallel and hence generation of disclination is reduced or prevented. In particular, by employing a circular shape for the pixel electrode 11', the most stable alignment is obtained. By preventing generation of disclination in this manner, high-speed, wide-angle of visibility, and high-contrast display is achieved.

Third Exemplary Embodiment

Referring now to FIG. 7, the liquid crystal device according to a third exemplary embodiment of the present invention will be described. In the present exemplary embodiment, the same parts as in the aforementioned first exemplary embodiment are represented by the same reference numerals and will not be described here.

In the present exemplary embodiment of the invention, chiral material is added to a liquid crystal layer 30'. Hence alignment of the liquid crystal molecules L can be controlled more stably. In the liquid crystal device of a homeotropic alignment type described above, the liquid crystal molecules L fall down in the state of being twisted in predetermined directions when a voltage is applied. The twisting directions are not constant, but are unstable. Hence the twisting directions of the liquid crystal molecules are random among different pixels, although the twisting directions are the same in the same pixel. When the plurality of domains being different in twisting direction are disposed in the display area in this manner, the possibility of generation of disclination in the boundary area increases and may result in deterioration of transmittance ratio. However, according to the present exemplary embodiment, such generation of disclination is reduced or prevented by making all the pixels twisted in the aforementioned same direction by adding chiral material to the liquid crystal layer 30'.

In this exemplary embodiment, it is also possible to provide a retardation film as a circular polarization injecting device at the opposed position with the intermediary of the liquid crystal layer 30'. According to the structure of the first exemplary embodiment described above, the present liquid crystal device is provided with quarter retardation films 14, 24 between the lower substrate 10 and the lower polarizer 15 and between the upper substrate 20 and the upper polarizer 25, respectively. In this structure, light beam passing through the liquid crystal layer 30' is circularly polarized. Hence luminance of the liquid crystal device does not depend on the angle between the director of the liquid crystal molecules and the transmission axes of the polarizers 15, 25. Therefore, deterioration of luminance caused by misalignment of the angle can be reduced or prevented.

FIG. 8 shows microphotographs of the pixel in a state in which a voltage is applied. FIG. 8(A) shows a case in which the retardation films 14, 24 are not provided (that is, linear polarization mode), and FIG. 8(B) shows a case in which retardation films 14, 24 are provided (that is, circular polarization mode). As shown in FIG. 8(A), in the liquid crystal device with chiral material is added, the liquid crystal molecules are twisted in the same direction in every pixel. Hence quenching patterns, which are more stable, are generated at the center of the pixel. On the structure shown in FIG. 8(B) in which the circular polarization mode is employed, the quenching pattern is generated only at a center point of the pixel, and the area is smaller than the mode shown in FIG. 8(A).

Therefore, according to the present exemplary embodiment, a feeling of roughness is eliminated. Hence brighter display is achieved. By employing the circular polarization mode, the transmittance ratio may be further enhanced.

The present invention is not limited to the exemplary embodiments described above, and various modifications may be made without departing the scope of the present invention.

For example, in the aforementioned exemplary embodiments, the position of generation of disclination is restrained within the pixel by aligning the liquid crystal molecules L from the peripheral portions of the pixel toward the center of the pixel. However, it is also possible to provide a projection or an opening on the pixel electrode in order to fix the position further accurately. For example, when the opening is provided on the pixel electrode, the position of generation of disclination can be fixed reliably within the area of the opening since the equipotential surface of this specific portion is deformed. When the projection is provided on the pixel electrode, the same effect as the case in which an opening is provided is obtained.

In the aforementioned exemplary embodiments, the transmissive structure is employed as the liquid crystal device of the present invention. However, a reflective structure, or a transflective structure may be employed. When the reflective liquid crystal device is employed, a metallic reflective film of high reflectivity, such as Al or Ag, or a laminated film including the metallic reflective film and a transparent conductive film may be utilized for the pixel electrode. It is also possible to use opaque material, such as a semiconductor substrate, for the lower substrate 10 in addition to the translucent material, such as glass.

Electronic Equipment

A projection type display device, which is an example of electronic equipment according to an aspect of the present invention, will be described below.

FIG. 8 is a schematic showing an example of a so-called three-plate type liquid crystal projector, in which the liquid crystal devices in the aforementioned exemplary embodiments are used as three liquid crystal light bulbs (light modulating device). In the drawing, reference numeral 510 designates a light source, reference numerals 513 and 514 designate dichroic mirrors, reference numerals 515, 516, and 517 designate reflecting mirrors, reference numerals 518, 519, and 520 are relay lenses, reference numerals 522, 523, and 524 designate liquid crystal light bulbs, reference numeral 525 designates a cross dichroic prism (color mixing device), and reference numeral 526 designates a projection lens system (projecting device).

The light source 510 includes a lamp 511, such as a metal halide lamp, and a reflector 512 to reflect light from the lamp 511. The dichroic mirrors 513, 514 are color separating device to separate light emitted from the light source into a plurality of light beams different in colors from each other, and the dichroic mirror 513 to reflect blue light and green light allows red light out of white light from the light source 510 to pass through and reflects blue light and green light. The transmitted red right is reflected from the reflecting mirror 517 and enters into the red-light-specific liquid crystal light bulb 522.

Green light out of colored light reflected from the dichroic mirror 513 is reflected from the dichroic mirror 514 to reflect green light and enters into the green-light-specific liquid crystal light bulb 523. Blue right also passes through the second dichroic mirror 514. Light conducting device 521, including a relay lens system made up of an injection lens 518, a relay lens 519, and a light emission lens 520, is provided for blue light in order to compensate for the difference of the length of light path from green light and red light and blue light is injected into the blue-light-specific liquid crystal light bulb 524 therethrough.

Then, each light bulb 522–524 modulates injected colored light, forms corresponding image light, and outputs it to the cross dichroic prism 525. The prism 525 is formed by adhering four right-angle prisms and forming a dielectric multilayer film to reflect red light and a dielectric multilayer film to reflect blue light on the inner surfaces thereof in a cross-shape.

Three image lights are combined by these dielectric multilayer films and light representing a color image is formed. The combined light is projected on a screen 527 by the projection lens system 526, and the image is displayed in an enlarged manner.

Since the liquid crystal device of the aforementioned exemplary embodiments is used as a light bulb in the projection type display device arranged as describe above, clear image display without providing a feeling of roughness is achieved at a low cost.

In addition to the projection type display device described above, electronic equipment according to the present exemplary embodiment may be equipment provided with a mobile phone, a PDA, an electronic book, a personal computer, a digital still camera, a liquid crystal TV, a view finder type or a monitor-viewing video tape recorder, a car navigation system, a pager, an electronic databook, a calculator, a word processor, a work station, a TV phone, a POS terminal, or a touch-panel, and the liquid crystal device according to an aspect of the present invention may be applied to the direct-viewing display of such electronic equipment.

What is claimed is:

1. A liquid crystal device, comprising:
an array substrate including a plurality of pixel electrodes arranged in a matrix manner;
an opposed substrate including a conductive light shielding film having openings at positions opposing the pixel electrodes; and
a liquid crystal layer interposed between the substrates, the liquid crystal layer being formed of liquid crystal having negative dielectric anisotropy exhibiting homeotropic alignment in the initial alignment state, and the liquid crystal being controlled in alignment by an electric field developed by difference in electric potential between the pixel electrodes of the array substrate and the light shielding film of the opposed substrate.

2. The liquid crystal device according to claim 1, a projection or an opening formed on the pixel electrode.

3. The liquid crystal device according to claim 1, chiral material being added to the liquid crystal layer.

4. The liquid crystal device according to claim 1, the pixel electrode formed into a polygonal shape having no acute-angled portion.

5. The liquid crystal device according to claim 1, the shape of the pixel electrode being a regular polygon or a circle shape.

6. The liquid crystal device according to claim 1, further comprising:
a circular polarization injecting device to inject circular polarization onto the array substrate and the opposed substrate.

7. The liquid crystal device according to claim 1, a pixel pitch being 20 μn or below.

8. Electronic equipment, comprising:
the liquid crystal device according to claim 1.

9. The liquid crystal device according to claim 1, wherein the conductive light shielding film overlaps the pixel electrodes in plan view and surrounds a region of each of the pixel electrodes in plan view.

10. A liquid crystal device, comprising:
a pair of substrates;
a liquid crystal layer interposed between the substrates, the liquid crystal layer being formed of liquid crystal having a negative dielectric anisotropy exhibiting homeotropic alignment in the initial alignment state; and
a voltage applying device that applies voltage to the liquid crystal layer, the voltage applying device including a plurality of pixel electrodes arranged in a matrix and a conductive light shielding film, the pixel electrodes being disposed on one side of the liquid crystal layer and the light shielding film being disposed on the other side of the liquid crystal layer, the pixel electrode being selectively applied with voltage and the light shielding film being applied with a voltage to selectively develop an electric field between the pixel electrode and the light shielding film for controlling alignment of the liquid crystal, the light shielding film having openings at positions opposing the pixel electrodes.

11. The liquid crystal device according to claim 10, wherein the conductive light shielding film overlaps the pixel electrodes in plan view and surrounds a region of each of the pixel electrodes in plan view.

* * * * *